Jan. 3, 1956
R. NEWIRTH
2,729,330
ELUTRIATION SYSTEM
Filed April 18, 1951
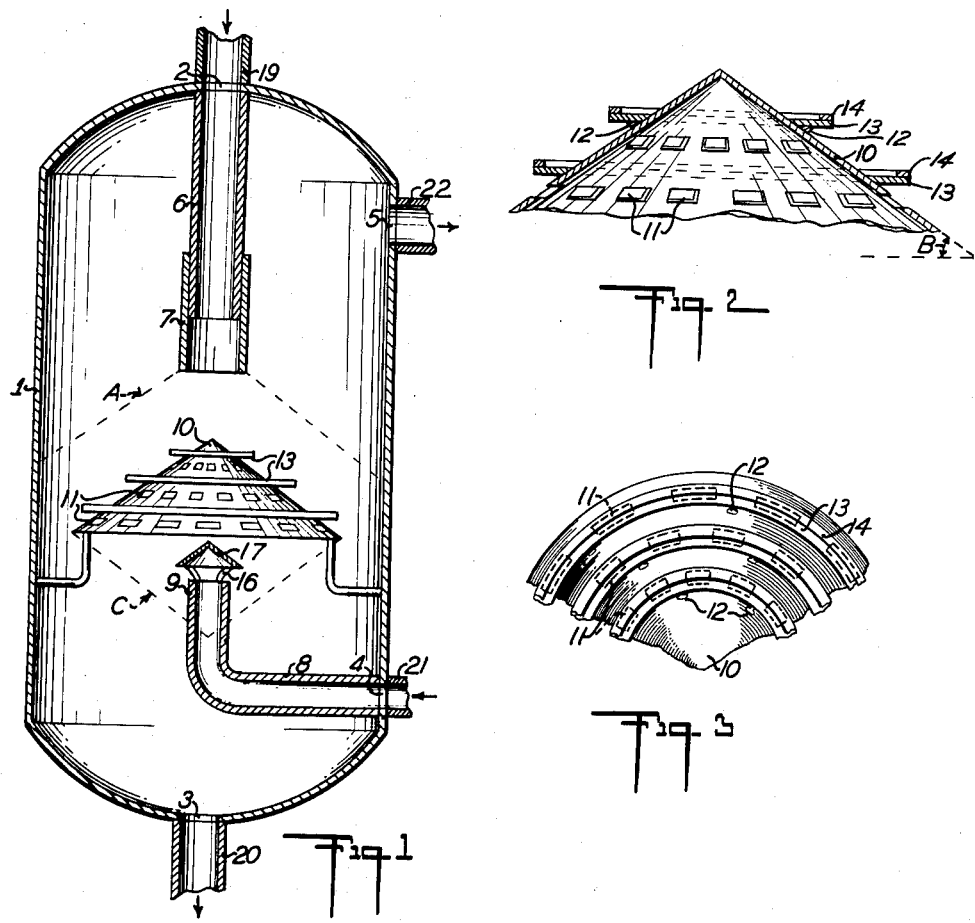
INVENTOR
Raymond Newirth
BY
ATTORNEY

United States Patent Office 2,729,330
Patented Jan. 3, 1956

2,729,330
ELUTRIATION SYSTEM
Raymond Newirth, Gibbstown, N. J., assignor to Houdry Process Corporation, Wilmington, Del., a corporation of Delaware Application April 18, 1951, Serial No. 221,688

5 Claims. (Cl. 209—138)

This invention relates to apparatus for recycling gravitating beds of solids in particle form of the type widely used in the conversion or cracking of hydrocarbons; and more particularly to the separation therefrom of "fines" or minute solid particles.

In recycling systems handling a moving-bed of particle form solids of the type referred to, the solids which are of granular size (for example, in the range of about 4 to 10 mesh, as determined by standard Tyler screens) produce fines, or minute solid particles of considerably smaller size as the result of attrition. The presence of these fines is sometimes highly objectionable, as an accumulation thereof might effect a substantial change in the operating characteristics of the system. It is therefore desirable, and in some instances absolutely essential, to remove from the moving-bed of particle form solids the fines that are present therein. This removal of fines from a primary solids-recycling system is conveniently conducted by diverting a portion of the circulating solids as a side stream to an elutriating system operating to remove fines from that stream and return larger sized particles to the primary solids-recycling system. A conventional solids circulating system and elutriator is shown, for example, in the Lechthaler et al. U. S. Patent No. 2,423,813. The same arrangement for removal of fines may be employed in connection with systems employing one or more gas lifts instead of mechanical elevators for upward transportation of solids during circulation.

It is among the objects of the present invention to provide an efficient elutriator of simple and inexpensive design.

Another object is the provision of an elutriation apparatus which is adapted to remove fines from a gravitating bed of particle form solids by subjecting said bed to an upwardly directed flow of inert gas which passes therethrough at such a velocity as to entrain in the gas stream only those particles which are of minute size.

The following description and annexed drawings set forth in detail certain illustrative embodiments of the invention, these being indicative of but one of a number of ways in which the principles of the invention may be employed.

In said drawings:

Figure 1 is a sectional elevation of an apparatus which has been constructed in accordance with the teachings of the present invention;

Figure 2 is an enlarged fragmentary elevational view of a part of the apparatus of Figure 1; and Figure 3 is a fragmentary plan of the showing of Figure 2.

Referring more particularly to the drawings, numeral 1 designates a vertically disposed substantially cylindrical housing for enclosing the elutriation apparatus of the present invention; the top and bottom of this housing being respectively provided with solids inlet and outlet ports, as at 2 and 3. The side-wall of the substantially cylindrical housing 1 is provided with a lower gas inlet port and an upper gas outlet port, as shown at 4 and 5 respectively.

Communicating with the solids inlet port 2 is a tubular solids inlet conduit 6 which extends downwardly into the housing 1 for a substantial distance. A cylindrical sleeve 7 is disposed adjacent the lower end of the tubular solids inlet conduit 6 for telescopic movement with respect thereto.

Communicating with the gas inlet port 4 and extending horizontally into the lower portion of the substantially cylindrical housing 1 is a gas inlet conduit 8 which is provided with a right angularly disposed vertically extending nozzle 9, the axis of which is in alignment with the axis of said cylindrical housing.

Disposed within the substantially cylindrical housing 1 at a position which is between the upper end of the vertically extending nozzle 9 and the lower end of the cylindrical sleeve 7 is a suitably supported hollow cone 10 which is disposed substantially concentrically within the housing 1 and therefore with its apex in coaxial alignment with the tubular solids conduit 6.

Referring more particularly to Figure 2, the hollow cone 10 is provided with a plurality of vertically spaced horizontal rows of laterally spaced slots or ports 11. Projecting from the outer surface of the cone 10 between each horizontal row of slots or ports 11 is a series of lugs 12, each series thereof supporting an annular deflector ring 13, which is concentrically disposed with respect to the axis of the cone 10. To each of these rings 13 there is secured a superposed ring 14 of the same outside diameter but of relatively larger inside diameter, these rings 14 being composed of a suitable abrasive resistant material.

The rings 13—14 which are carried by the cone 10 are constructed and arranged to completely overlie the next adjacent series or horizontal row of slots or ports 11 but in slightly spaced relationship with respect thereto.

Referring more particularly to Figure 1, a conical deflecting shield 17 is suitably disposed on the upper end of the vertically extending nozzle 9 for a purpose which will be later described.

In operation: A substantially compact column of particle form solids, ranging in sizes from fines to granular particles, is conveyed, as from a transfer chute or conduit or from the gas-lift disengaging chamber of a primary solids-recycling system (not shown) through a duct 19 to the solids inlet port 2 from which it moves into and through the solids inlet conduit 6 and its telescopically mounted cylindrical sleeve 7, thereby forming within the substantially cylindrical housing an upper gravitating bed whose upper surface A (in Figure 1) assumes an inclined angle relative to the horizontal which is approximately equal to the angle of repose of the solids. This gravitating bed of solids is supported by the elutriator cone 10, which is so constructed that its outer surface is disposed at an angle B (in Figure 2) with respect to the horizonal. According to a preferred embodiment of the present invention, this angle B is at approximately 35°, which approximates the angle A and accordingly the angle of repose of the solids in the gravitating bed, whereby the depth of the upper gravitating bed will be substantially uniform over the entire surface of the bed-supporting cone 10.

By suitable vertical adjustment of the cylindrical sleeve 7, the depth of the upper gravitating bed, which lies above the cone 10, may be set at any predetermined desired value. To obtain the desired separation of fines, the height of the bed is set to provide a fairly shallow layer of solids on the cone, as not in excess of 12 inches measured normal to the lateral surface of the cone and preferably about 3–6 inches.

The solids of the upper gravitating bed move downwardly past the marginal edge of the cone 10, forming therebeneath a lower gravitating bed whose upper surface C (in Figure 1) is inclined to the horizontal at an angle approximating the angle of repose of the solids. The heavier particles of the lower gravitating bed of solids discharge from the bottom of the substantially cylindrical housing 1 through the solids outlet port 3 and a communicating conduit 20 to a convenient point of readmission to the primary solids-recycling system.

An inert gas is introduced to the gas inlet port 4 through a conduit 21, and it passes through gas inlet conduit 8, issuing from the vertically extending nozzle 9, which is disposed below the apex of the cone 10 and above the inclined surface C of the lower gravitating bed. This gas is substantially uniformly distributed throughout the open space within and below the cone 10 and passes therefrom through apertures or ports 11, under the overhanging rings 13 and from thence into and through the gravitating bed lying above the cone. Since this bed is of substantially uniform depth with relation to the supporting cone and the gas distributing means associated therewith, the gas passes substantially uniformly through the gravitating bed. The amount of gas introduced through nozzle 9 is controlled such that the volume and velocity of the gas as distributed through the apertures or ports 11 of cone 10 is sufficient to effect elutriation of the gravitating bed on cone 10 without substantially interfering with the gravitational flow of particles corresponding in size to that retained on about a 10 mesh Tyler screen whereas finer material is entrained in the elutriating stream in such manner that such fine material entrained in the gas stream is swept upwardly and out of the gravitating bed, into the open space in the upper region of housing 1 and from there being discharged through the gas outlet port 5 and communicating gas outlet conduit 22. While elutriating gas has been referred to as an inert gas, i. e. air, steam, flue gas or the like, other gases may possibly be employed as long as they are generally compatible with conditions and materials of the elutriation system.

The solids moving downwardly in the upper gravitating bed are substantially prevented from falling through the apertures or ports 11 of cone 10 by means of the rings 13 which also aid in distributing the elutriating gas. However, if any solids pass through the ports or slots 11, they are prevented from falling into the vertically extending gas discharge nozzle 9 by the superposed conical shield 17 suitably supported in spaced relation from nozzle 9 by members 16.

From the foregoing it will be seen that the apparatus of the present invention operates to effect removal of fines from a gravitating bed of particle form solids and that the operation of such apparatus is consistent with the externally associated operational steps of previously known elutriation systems resulting thereby in the adaption of this invention to existing solids recycling systems without departing substantially from established operating conditions. The adjustability of the depth of the circumferentially complete and relatively shallow bed coupled with the controlled admission rate of the elutriating gas obtains a flexibility not heretofore available. Moreover, the manner of removing fines in accordance with this invention from a gravitating bed which is in continuous contact with similarly gravitating compact bodies of such solids both above and below such a bed prevents free fall of such solids in any appreciable quantity and thus obviates attrition accompanying such free fall. It is noticeable also that simple and positive control of the solids bed level is readily obtained directly above the cone for elutriation, by the adjustable sleeve 7.

While there have been shown and described herein certain specific embodiments of the present invention, it will be understood readily that the invention is not to be limited exactly thereto, since various modifications may be made without departing from the scope of the invention as defined in the appended claims.

I claim as my invention:

1. In a process wherein a body of granular material having an average particle size in the range of about 4 to 10 mesh is continuously circulated under conditions conducive to attrition of the solid particles resulting in the production of fines, the method of removing said fines from said body which comprises the steps of: introducing a compact moving stream of said granular material at an intermediate level within a confined elutriating zone; withdrawing granular material from the bottom of said zone at a rate adapted to maintain said granular material within said zone as a compact, non-turbulent gravitating bed receiving said stream of granular material directly upon a portion of its surface; flowing the top portion of said bed laterally downward from the zone of solids introduction as a supported shallow layer of uniform depth; passing gas upwardly throughout said moving layer at a velocity sufficient to suspend and carry upwardly through the compact remaining portion of said layer only said fines; and discharging the suspension of gas and fines from the region of said elutriating zone above said moving layer, the rate of flow of said supported layer being controlled by the rate of said withdrawal of granular material from the bottom of said elutriating zone.

2. A method as in claim 1 in which said stream of solids is introduced centrally within said elutriating zone so that said layer of granular material gravitates radially outward and downward about the circumference of said zone of introduction with its lowermost boundary substantially in the form of a cone.

3. Apparatus for separating fines from a continuously moving body of fines-containing granular material comprising: an elutriating chamber; means for introducing the mixture of fines and granular material centrally at an intermediate level within said chamber; means for withdrawing granular material from the bottom of said chamber at a rate adapted to maintain a continuous, compact, non-turbulent mass of said material as a moving bed extending upwardly to said granular material introduction means; a perforate conical member centrally disposed in the top region of said bed adapted to support the uppermost portion of said bed as a compact, non-turbulent shallow layer gravitating downwardly and outwardly from the central to the peripheral region of said chamber the surface of which is disposed at approximately the angle of repose of the solids in the gravitating bed; means for introducing gas to said chamber in a solids-free zone directly beneath said conical member; and a gas outlet at the upper end of said chamber; said gas introduction means being adapted to provide a flow of gas through said perforate conical member and through said shallow layer sufficient to suspend said fines and convey them out of said chamber through said gas outlet while maintaining said moving layer as a compact, non-turbulent mass.

4. Apparatus as in claim 3 in which said perforate conical member is provided with a plurality of uniformly-distributed apertures and deflector means overlying said apertures adapted and arranged to prevent the admission of solids from the bottom of said layer into said apertures.

5. Apparatus as in claim 3 including means for adjusting the vertical distance between the discharge end of said introduction means and the apex of said conical member to thereby vary the depth of said compact moving layer of granular material.

References Cited in the file of this patent

UNITED STATES PATENTS

| | | |
|---|---|---|
| 884,551 | Wright | Apr. 14, 1908 |
| 884,552 | Wright | Apr. 14, 1908 |
| 1,522,151 | Stebbins | Jan. 6, 1925 |
| 1,695,369 | Davis | Dec. 18, 1928 |
| 2,125,870 | Arthur | Aug. 9, 1938 |
| 2,200,472 | Erdmann | May 4, 1940 |
| 2,408,810 | Puening | Oct. 8, 1946 |
| 2,423,813 | Lechthaler | July 8, 1947 |
| 2,446,786 | Redhead | Aug. 10, 1948 |
| 2,511,088 | Whaley, Jr. | June 13, 1950 |
| 2,561,396 | Matheson | July 24, 1951 |

FOREIGN PATENTS

| | | |
|---|---|---|
| 620,822 | Germany | Oct. 28, 1935 |